MOWER CUTTING DEVICE

Original Filed Aug. 27, 1965 2 Sheets-Sheet 1

MOWER CUTTING DEVICE

Original Filed Aug. 27, 1965 2 Sheets-Sheet 2

United States Patent Office

Re. 27,647
Reissued May 29, 1973

27,647
MOWER CUTTING DEVICE

Eugene V. Stair, Box 238, Rte. 1, Caddo, Okla. 74720

Original No. 3,482,380, dated Dec. 9, 1969, Ser. No. 483,203, Aug. 27, 1965. Application for reissue Nov. 23, 1970, Ser. No. 92,333
Int. Cl. A01d *55/18*
U.S. Cl. 56—295 8 Claims

Matter enclosed in heavy brackets [ ] appears in the original patent but forms no part of this reissue specification; matter printed in italics indicates the additions made by reissue.

ABSTRACT OF THE DISCLOSURE

The present invention relates to a cutting device for use with rotary power mowers. More particularly the cutting device for such use is comprised of a cutting plate having the combination of a straight cutting edge and a series of saw-teeth along its outer end arranged in a particularly advantageous configuration. This particular combination of a leading knife-like cutting edge combined with the particular sawtooth configuration provides a cutting means which will not become bound up with the cuttings and also avoids wedging and binding experienced with straight knife-like cutting edges.

This invention relates to cutting devices and in particular a cutting device to be used with a rotary type mower.

While the present invention is not necessarily confined to such a use, it is particularly adapted to rotary type mowers customarily utilized in cleaning up land infested with heavy growths of weeds, briars, bushes, or small trees such as cutover timber land, ranch land, and highway right-of-ways.

One of the main difficulties experienced with the use of present rotary mowers for these purposes is the presence of tree stumps and small trees which these rotary mowers are not able to cut.

Cutting devices presently in use with rotary power mowers for the most part have straight cutting edges. These cutting devices will only operate properly and without damage to the mower when the growth is light and free of stumps because thick cuttings tend to clog and bind about the straight cutting edges.

For the most part, the only remedy introduced for this problem which has had any semblance of success has been to increase the horsepower driving the blades. As is evident, such a remedy is not only costly, but is somewhat ineffective.

While toothed configurations have been provided along the leading edges of rotary mower blades in an attempt to improve their cutting characteristics, such blades have not proven effective for cutting brush which is heavy and contains small trees and tree stumps. The toothed configurations previously provided along the leading edges of rotary mower blades have been of a rough edge or step cut knife variety, incapable of freeing the cuttings and therefore afflicted with the same wedging and binding experienced with straight knife-like cutting edges.

I have discovered that the clogging, binding and stalling experienced when cutting heavy growths with a rotary mower, can be overcome by providing a cutting device which in addition to a straight knife-like leading edge also possesses a cutting edge at its outer periphery having a special saw tooth configuration which will not become bound up with cuttings.

With the rotation of my new and improved cutting device, the saw tooth edge is drawn through the heavy growth of stalks, small trees, stumps and other vegetation while the straight knife-like leading edge of the cutting device severs the lighter growths of vegetation. Thus my mower is designed to travel slower through heavy growths of vegetation so that the saw toothed edges do all the cutting than through light vegetation wherein the severing of the vegetation is accomplished by the full length of the straight knife-like leading edge of the cutting device.

Accordingly, it is an object of the present invention to provide an improved cutting device for a rotary type mower which can be used in cutting heavy growths of bush and tree stumps.

Another object of the present invention is to provide a cutting device possessing a knife-like blade at its leading edge and a series of cutting saw teeth set in a definite configuration positioned at its outer extremity.

Another object of the present invention is to provide a cutting device for cutting brush and tree stumps which can be readily attached to conventional rotary mowers and land clearing machines.

Another object of the present invention is to provide a cutting device for brush and tree stumps which will foster the development of new timber clearing machines powered by farm and ranch type tractors in the medium horsepower range.

Still another object of the present invention is to provide a cutting device for cutting heavy growth and tree stumps which does not have to expend more than minimal horsepower.

Other details, objects and advantages of the present invention will become apparent from the following description of the present embodiment thereof, taken in conjunction with the drawings which accompany and form part of the specification.

Figure 1:
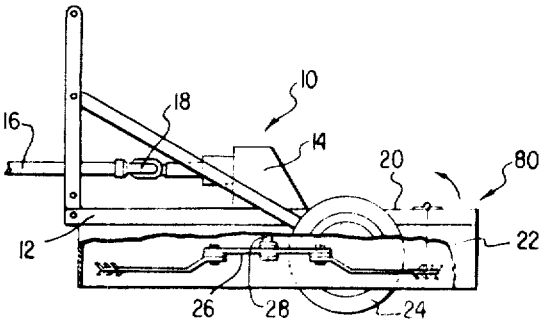
FIG. 1 is a partly broken away side elevation of a rotary mower embodying the invention.

Referring more particularly to the figures of the drawing there is shown in FIGURE 1 a rotary mower 10 comprised of a frame member 12 which supports a gear box 14 driven by a drive shaft 16 and universal joint 18. The frame 12 carries a top cover 20 to which is attached a depending cutter housing 22. The machine rides on a pair of wheels 24 attached to the sides of the housing.

The blade holder of the invention consists of one or more bars 26. Means are provided for attaching said one or more bars 26 substantially at their midpoint to shaft 28 which extends through the top cover 20 to the gear box 14. To determine the position of the bar on shaft 28, and hence the elevation from the ground, one or more washers 30 may also be slipped on the shaft. The assembly is then held removably in place by means of lock washer 30' and nut 31.

Figure 2:
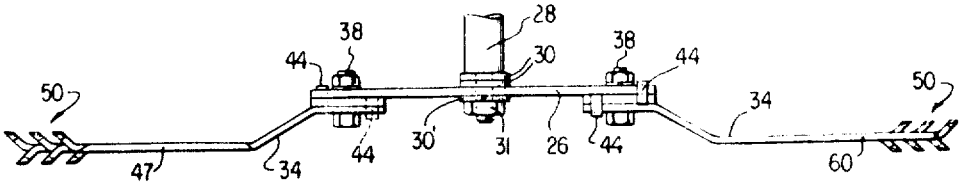
FIG. 2 is an enlarged elevation view of the cutter illustrated in FIG. 1.
Figure 3:
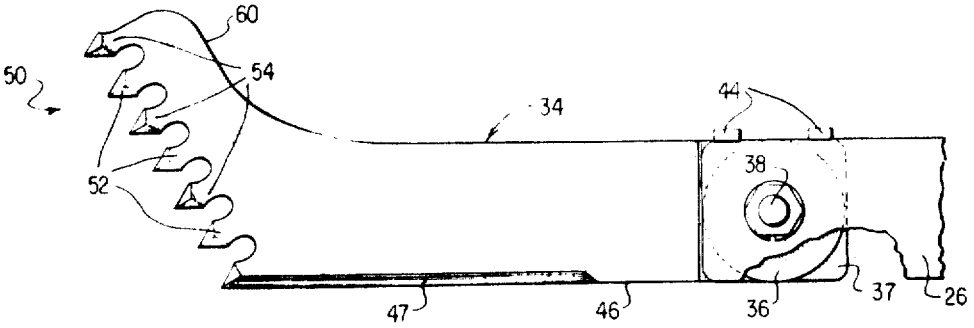
FIG. 3 is an enlarged top view of one of the cutting devices.

The ends of each of the bars 26 as shown in FIGURE 2 are provided with an aperture 32 for receiving a bolt 38 for attaching the cutting plates 34 thereto.

Figure 4:
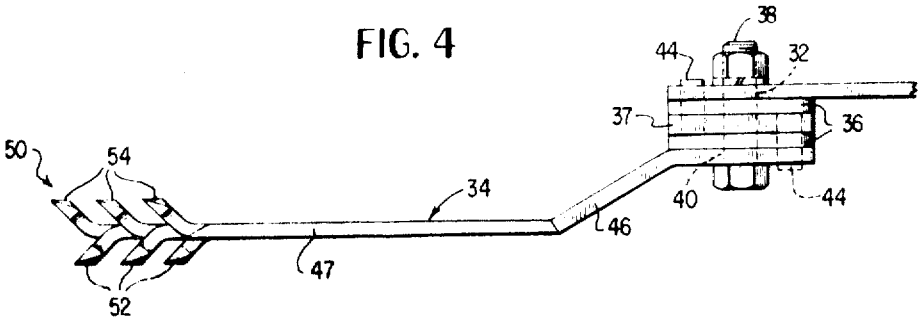
FIG. 4 is an enlarged front view of the cutting device shown in FIGS. 1–3.

Each of the cutting plates 34 as illustrated in FIG. 4 comprise an elongated body of steel or the like with an aperture positioned at 40 for the attachment of the cutting plate to the end of one of the bars.

To determine the position of the cutting plate with regard to the bars, and hence to its relation from the ground, one or more washers 36 as well as an adapter spacer 37 may be placed on the bolt 38 between the cutting plate 34 and bar 26. On the trailing edge of the adapter spacer two flanges or guards 44 are provided, one of which extends upwardly and other downwardly to insure forward rigidity of the cutting plate 34 in relation to the bar 26. It is noted that if preferred, the adapter spacer may be eliminated by providing each of the cutting plates with an upwardly extending flange.

A portion of the leading edge 46 of each of said cutting plates possesses a knife-like straight edge 47, while one end of said cutting plate 34 is formed with a plurality of alternately, aligned spaced cutting saw teeth 50, the leading edges of which are sharpened. These alternately aligned spaced cutting saw teeth 50 form a first 52, and a second 54, series of aligned teeth with an acute angle formed therebetween. These cutting saw teeth have the ability to cut vegetable matter which would be impossible to cut with a straight cutting edge or rough toothed edge knives of the prior art.

The plates 34 bearing the cutting teeth are formed with the saw teeth closest to the trailing edge 60 of the plates extending a greater distance outwardly from the shaft than the saw teeth closest to the plates leading edge. This configuration enables the saw teeth to advance into the vegetation at a progressive rate and is a further aid in the prevention of binding common in rotary mowers of the prior art.

Figure 5:
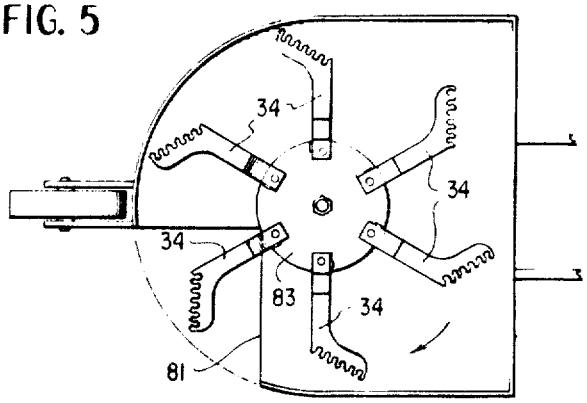
FIG. 5 is a bottom view of the cutting device as embodied in a rotary mower of the disc variety.

It is to be pointed out that with the present invention any number of cutting plates may be provided mounted on bars, mounted at right angles to each other, or they may be mounted on an equivalent construction wherein the bars are formed integrally from a single piece, such as a disc shown in FIG. 5.

A rotary mower equipped with my improved cutting device can also be used to cut down large trees which a tractor or a mower cannot push down. As illustrated in FIG. 1, a section 80 of the mower housing may be made removable so that the saw tooth cutting edges can be placed in direct contact with the trees or stumps to be cut.

Figure 6:
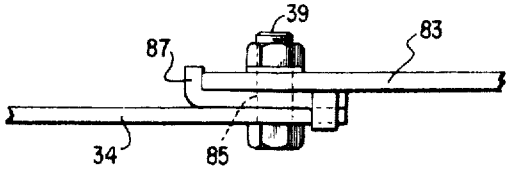
FIG. 6 is a sectional view of the cutting plate of the present invention attached in a disc type rotary mower.

In FIG. 5 there is shown an embodiment of the present invention as applied to a disc-type rotary mower of the variety having a single trailing wheel. In this embodiment section 81 of the mower housing may be made removable and the mower backed into contact with trees or high stumps to be cut. In order to insure forward rigidity of the cutting plate 34 in relation to the disc 83, as shown in FIG. 6, an adapter spacer 85 is placed between the cutting plate 34 and the disc 83, on bolt 39. The adapter spacer 85 possesses an upwardly extending flange 87 which engages the outer periphery of the disc 83, and a downwardly extending flange 89 which engages the trailing edge of the cutting blade 34.

It will be apparent from the foregoing that I have disclosed an improved cutting device for rotary mowers which will enable the rotary mower to clear heavy brush and stumps and cut down trees without the binding and clogging and the expenditure of unnecessary horsepower which exists in rotary mowers of the prior art.

It is also apparent that not only is my cutting device adaptable to conventional rotary mowers and land clearing machines but that it will undoubtedly foster the development of new timber clearing machines powered by farm and ranch-type tractors in the medium horsepower range.

The invention may be embodied in other specific forms without departing from the spirit or essential characteristics. The present embodiments are therefore considered in all respects illustrative and not restrictive, the scope of the invention being indicated by the appended claims rather than by the foregoing, and all changes which come within the meaning and range of equivalency of the claims are therefore intended to be embraced therein.

What is claimed and desired to be secured by the United States Letters Patent is:

1. A cutting device for a rotary mower having a power driven rotary shaft, comprising blade holding means, attaching means on said blade holding means for attaching said blade holding means to said rotary shaft, at least one cutting plate having a straight cutting edge formed on its leading edge and a plurality of alternately aligned spaced cutting saw-teeth on one of its longitudinal ends extending generally between its leading edge and trailing edge, the leading edges of said cutting saw-teeth being sharpened, securing means for securing said cutting plate to said blade holding means with its saw-toothed end projecting longitudinally outward from said blade holding means, said cutting saw-teeth being formed in a first and second aligned series having an acute angle therebetween, and the cutting saw-teeth closest to said trailing edge of said cutting plate extending a greater distance outwardly from said rotary shaft than the teeth closest to the cutting plate leading edge.

2. A cutting device as defined in claim 1, comprising means associated with said blade holding means and said cutting plate to maintain said plate rigid in a forward direction relative to said blade holding means.

3. A cutting device for a rotary mower as defined in claim 2 wherein said associated means comprises a flange on said plate which cooperates with said securing means in maintaining said plate rigid in a forward direction in relation to said blade holding means.

4. A cutting device for a rotary mower as described in claim 2 wherein said securing means for each of said cutting plates includes an adapter spacer having an upwardly and a downwardly extending flange associated with said blade holding means and said cutting plate for maintaining said plate rigid in relation to said blade holding means.

5. A rotary mower for cutting heavy growths of weeds, briars, bushes, stumps and trees, comprising a housing having a substantially horizontal top cover plate secured to the upper edge of said housing, means supporting said housing a predetermined distance above the ground, a shaft mounted in said top cover for rotation about an axis normal to the plane of said top cover plate, blade holding means rigidly secured to said shaft, a cutting plate rigidly mounted at each end of said blade holding means, the free ends of said cutting plates being received within said housing, each of said cutting plates including a straight knife-like leading edge and a plurality of alternately aligned spaced cutting saw-teeth on its free longitudinal end extending generally between its leading edge and trailing edge, the leading edges of said cutting saw-teeth being sharpened, said cutting saw-teeth being formed in a first and second aligned series having an acute angle therebetween, and the cutting saw-teeth closest to the trailing edge of the cutting plates extending a greater distance outwardly from the rotary shaft than the teeth closest to the leading edge of the cutting plates.

6. A rotary mower for cutting heavy growths of weeds, briars, bushes, stumps, and small trees, as described in claim 5 wherein a portion of said housing is removable so that large trees and high stumps which will not fit under said housing can be brought into contact with the cutting saw teeth on the cutting plates.

*7. A cutting device for a rotary mower having a power driven rotary shaft, blade holding means attached to and extending laterally from said shaft and having an outer edge, at least one cutting blade pivotally connected at one end adjacent the outer edge of said blade holding means, the other end of said cutting blade having a knife-like cutting edge formed on its leading edge and a plurality of cutting teeth on its outer peripheral edge extending between its leading edge and trailing edge, the cutting teeth closest to said trailing edge extending a greater distance outwardly from said rotary shaft than the teeth closest to said leading edge, positioning means associated with said blade holding means and said cuttting blade to main-*

*tain said blade in a predetermined operative radial cutting position as said shaft and blade holding means rotate in a forward direction, and said cutting blade approaches the material to be cut, said positioning means permitting substantially unrestrained pivotal movement of said cutting blade in a rearward direction, if necessary, to prevent breakage thereof.*

*8. A cutting device as defined in claim 7, comprising a plurality of cutting blades pivotally connected to said blade holding means, and a plurality of said positioning means each associated with a cutting blade for positioning each of said blades independently of the other blades.*

References Cited

The following references, cited by the Examiner, are of record in the patented file of this patent or the original patent.

UNITED STATES PATENTS

| | | | |
|---|---|---|---|
| 2,791,875 | 5/1957 | Faas | 56—17.4 |
| 2,939,264 | 6/1960 | Kontis | 56—295 |
| 2,924,058 | 2/1960 | Brooks | 56—295 |
| 750,329 | 1/1904 | Windingstad | 56—25.4 |
| 2,680,945 | 6/1954 | Reed | 56—295 |

ANTONIO F. GUIDA, Primary Examiner